(12) United States Patent
Lou et al.

(10) Patent No.: US 7,826,924 B2
(45) Date of Patent: Nov. 2, 2010

(54) STANDALONE INTELLIGENT AUTOLOADER WITH MODULARIZATION ARCHITECTURES AND SELF-ADAPTIVE MOTION CONTROL ABILITY FOR MASS OPTICAL DISKS DUPLICATION

(75) Inventors: Mingji Lou, Alhambra, CA (US); Chia Chun Cheng, Alhambra, CA (US); Shuo Wei Chang, Alhambra, CA (US); Weicheng Chu, Alhambra, CA (US); Chin-han Chou, Alhambra, CA (US)

(73) Assignee: Vinpower, Inc., Alhambra, CA (US)

( * ) Notice: Subject to any disclaimer, the term of this patent is extended or adjusted under 35 U.S.C. 154(b) by 1016 days.

(21) Appl. No.: 11/382,672

(22) Filed: May 10, 2006

(65) Prior Publication Data

US 2007/0263492 A1 Nov. 15, 2007

(51) Int. Cl.
*G06F 19/00* (2006.01)

(52) U.S. Cl. ............... 700/245; 700/213; 700/218; 369/30.19; 369/30.32; 414/222.09; 414/222.13; 414/937; 414/941

(58) Field of Classification Search ............... 700/245, 700/213, 218; 414/147, 217, 936, 937, 939, 414/941; 369/30.19, 30.32
See application file for complete search history.

(56) References Cited

U.S. PATENT DOCUMENTS

| | | | | |
|---|---|---|---|---|
| 5,914,918 A * | 6/1999 | Lee et al. | ............... | 369/30.32 |
| 6,141,298 A * | 10/2000 | Miller | ............... | 369/30.33 |
| 6,208,612 B1 * | 3/2001 | Miller | ............... | 369/30.19 |
| 6,505,087 B1 * | 1/2003 | Lucas et al. | ............... | 700/83 |
| 6,532,198 B1 * | 3/2003 | Miller | ............... | 369/30.43 |
| 6,560,510 B1 * | 5/2003 | Costas | ............... | 700/218 |
| 6,636,462 B1 * | 10/2003 | Drynkin et al. | ............... | 369/30.19 |
| 6,735,483 B2 * | 5/2004 | Martin et al. | ............... | 700/29 |

(Continued)

OTHER PUBLICATIONS

Abu Zaharin et al., "A study on the DC motor speed control by using back-EMF voltage", May 2003, Asia sensor,Internet, pp. 359-364.*

(Continued)

*Primary Examiner*—Khoi Tran
*Assistant Examiner*—Jaime Figueroa
(74) *Attorney, Agent, or Firm*—Jen-Feng Lee (57) ABSTRACT

An autoloader system with modularization architecture and self-adaptive motion control ability for mass optical disks duplication includes four physical modules: a robot arm module with sensors and joints dedicates for delivering and picking up optical disks; an optical disk duplication tower has a number of optical drives in a stack, or a matrix for optical disk duplication; a motion control module has an embedded motion controller and a power source to synchronize the motion of robot arm and duplication; a platform module has a base frame to fix other modules and a user interface. Some disk stacks are situated on top of platform module. The use of a self-adaptive control algorithm, consisting of a Motion Strategy Database, Initial Process, Motion Planning Process, Motion Generation Process and Motion Monitor Process, to ascertain system configurations and components furthest satisfy the required flexibility for modifying/upgrading hardware or ever-changing user needs. The use of DC motors and self-correcting adaptive algorithm provides better versatility to disk copier systems than most commonly used stepper motors, even in the case of "short tray" wherein the tray does not fully extend out. The stand-alone design of present invention further makes the use and operation of the disk copier easier and friendlier.

7 Claims, 10 Drawing Sheets

U.S. PATENT DOCUMENTS

| | | | |
|---|---|---|---|
| 6,822,932 B2 * | 11/2004 | Miller | 369/30.31 |
| 7,145,841 B1 * | 12/2006 | Miller | 369/30.31 |
| 7,253,580 B2 * | 8/2007 | Stockberger et al. | 318/610 |
| 7,293,950 B2 * | 11/2007 | Bonora et al. | 414/217.1 |
| 7,299,315 B2 * | 11/2007 | Ogino et al. | 711/103 |
| 7,363,260 B1 * | 4/2008 | Stamler et al. | 705/28 |
| 7,391,427 B2 * | 6/2008 | LeBlanc | 347/188 |
| 7,505,889 B2 * | 3/2009 | Salmonsen et al. | 703/23 |
| 2005/0001842 A1 * | 1/2005 | Park et al. | 345/474 |

OTHER PUBLICATIONS

Octave Systems, "Octave systems release new robotic duplicator", Sep. 1, 2005, Internet, 1 page.*

Processor, "CD/DVD duplicators", Jan. 13, 2006, vol. 28, Issue 2, Internet, pp. 1-4.*

Octave systems, Copy master II ProRobotic DVD/CD duplicator, Jul. 29, 2005, EvenDV.net, Internet, 2 pages.*

* cited by examiner

| | Action 1 | Action 2 | ... | Action N |
|---|---|---|---|---|
| Configuration 1 | $W_1^1(t)$ | $W_2^1(t)$ | | $W_N^1(t)$ |
| Configuration 2 | $W_1^2(t)$ | $W_2^2(t)$ | | $W_N^2(t)$ |
| ... | | | | |
| Configuration N | $W_1^N(t)$ | $W_2^N(t)$ | | $W_N^N(t)$ |

Table 1. Motion Strategy Database Example Layout

STANDALONE INTELLIGENT AUTOLOADER WITH MODULARIZATION ARCHITECTURES AND SELF-ADAPTIVE MOTION CONTROL ABILITY FOR MASS OPTICAL DISKS DUPLICATION

FIELD AND BACKGROUND OF THE INVENTION

The present invention relates generally to the design and construction of an optical disk autoloader and copier and can be used on CD, VCD, DVD and any other formats of audio/video and computer IT (information technology) disks.

The optical disk, including the format of CD, VCD, DVD, has been a popular data storage and exchange media of today. From film industry to small business, high volume disk duplication with minimal manpower is on demand. Using a robot arm to automatically load blank writable disks to optical record drives and pickup the formalized disk out is one of the solutions.

Today, we are facing the reality that the different types of optical disks on the market have increased substantially. The original compact disk (CD) were diversified to CD Audio, CD-Graphics, CD-Text, CD-Extra, CD-ROM, CD-ROM XA, CD-I, Video CD, Photo CD, CD-I Bridge, etc. Currently, the new Digital Versatile Disc (DVD) technology has matured as a high capacity CD-size disc for video, multimedia, games and audio application. More complicated diversity has come into the horizon, e.g. DVD-ROM, DVD-Audio, DVD-Video, DVD-RAW, DVD-RW, DVD-R, and hybrid formats DVD-plus. In the future, Blu-ray and HD DVD will no doubt create more uncertainty and diversity to the optical disk marketing. Besides the digital optical storing formats, the physical size and coating of the optical disks are also subject to other variations: mini-cd modifies the standard 12 cm CD size to a business card size or even smaller, and the shape of optical disks may not be a circle but a rectangle, a heart shape or any number of prototypes being worked on.

In today's commercial autoloader design, the robot arm only follow a fixed motion plan dedicated from factory-preset configuration; it can not be easily modified, maintained and updated by end users to respond and correspond to the changes brought about by the fast-paced-technical developments and ever-changing diverse optical data storage formats. For example, to reduce cost, space or other considerations, more and more models of optical drives has short tray or no tray, and can not be used with the present autoloader systems; the arm can not grab some min CD with specific size and shape; only a limited optical disk format can be recognized and duplicated; the on-site maintenance, repair and update capabilities are limited, or are translated into very costly proposition because of the limitation.

Furthermore, almost all the available disk copier systems in the market today uses stepper motors or servo motions, which is a form of digital motion actuator coupled with the use of a external computer. Although the incorporation of stepper/servo motors and external computers eases the construction of a disk copier system, it comes at the expense of reduced flexibility in adjusting to robotic arm movement. Such is the case as evidenced by the prior art of Lee et al. U.S. Pat. No. 5,914,918, Miller U.S. Pat. No. 6,141,298, Miller U.S. Pat. No. 6,208,612, Miller U.S. Pat. No. 6,532,198, and Miller U.S. Pat. No. 6,822,932.

Though users in this industry are starting to feel the problem, nothing is done to remediate the problem that the mixed functionality of present day autoloader design without distinctively separating out the functions (robot arm motion control, duplication, monitoring/sensing/feedback, and user interface, for example), the challenges and difficulties will continue to rise.

With the increasing demands on technology and complexity of software and mechanical systems, the reuse of software and mechanical components is becoming more and more important and a key factor in software and mechanical development practice.

Moreover, components are useful fragments of a system that can be assembled with other fragments to form larger pieces or complete applications. Hence, system should be developed by composing available components, and evolve by updating components replacing them with newer versions.

Indeed, in the autoloader duplication system, the better mechanism should be the module/component basis as proposed and claimed by present invention, resulting in re-usable components/modules and minimum component need to be replaced or modified or combined to build, and to satisfy the requirement of ever-changing diversity in the duplication machines market.

This invention uses modularization construction which is the key solution for improving the flexibility and comprehensibility of a system. A module in this invention can be either hardware (mechanical), or software (programming logic implemented with appropriate programming tools of choice), or combination of hardware/software forming a particular functional unit.

Although some prior art patents, such as Drynkin et al. U.S. Pat. No. 6,636,426 disclosed and claimed the use of DC motors having sensor feedback, Drynkin completely differs from present invention in that it lacks the modularization construction, either in the sense of physical hardware functional unit, or in the sense of software control modules, of present invention.

The modification for one module will not affect others. An end user can select a specific module combination to realize his application with minimum cost.

Most optical disk copiers today need to be hooked up with computers. Their operations are complicated, as a result. Present invention envisions the design and construction of an optical disk copier/loader to be a stand-alone system with easy user interface.

Moreover, most optical disk copiers come with factory pre-configured operation setting and thus do not contain modular design to allow, for example, the possibility of reconfiguration due to new type of writers/drives being put in place.

OBJECTS AND SUMMARY OF THE INVENTION

This invention uses the modularization configuration design construction and self-adaptive algorithms to solve the above problems, increasing the flexibility of robotic maneuvers in diversiform requirements. This system is divided to four physical modules with different functions: an optical disk duplication tower, a robot arm, a control and power unit, and a platform with user interface. The four modules can be easily assembled and combination with different model of modules by the end user.

Implementing the logical control of present system is a set of specially designed self-adaptive control algorithm made of four logical process-modules and one updatable motion strategy database. This control algorithm will identify the system configuration/combination in its initial state, and then based on this combination, it loads corresponding joints trajectory from trajectory database. Moreover, the reference trajectory and control rules can be real-time modified by the self-studying methods in the adaptive algorithm. Furthermore, the reference database can be upgraded by end-user from feeding the new resource disk into one of the optical drive in the system.

BRIEF DESCRIPTION OF THE DRAWINGS

The accompanying drawings, which are incorporated in and constitute a part of this specification, illustrate the preferred embodiments of the invention and together with the description, serve to explain the principles of the invention.

Table 1 shows the exemplar layout in the Motion Strategy Database.

DETAILED DESCRIPTION OF THE PREFERRED EMBODIMENT

Figure 1:
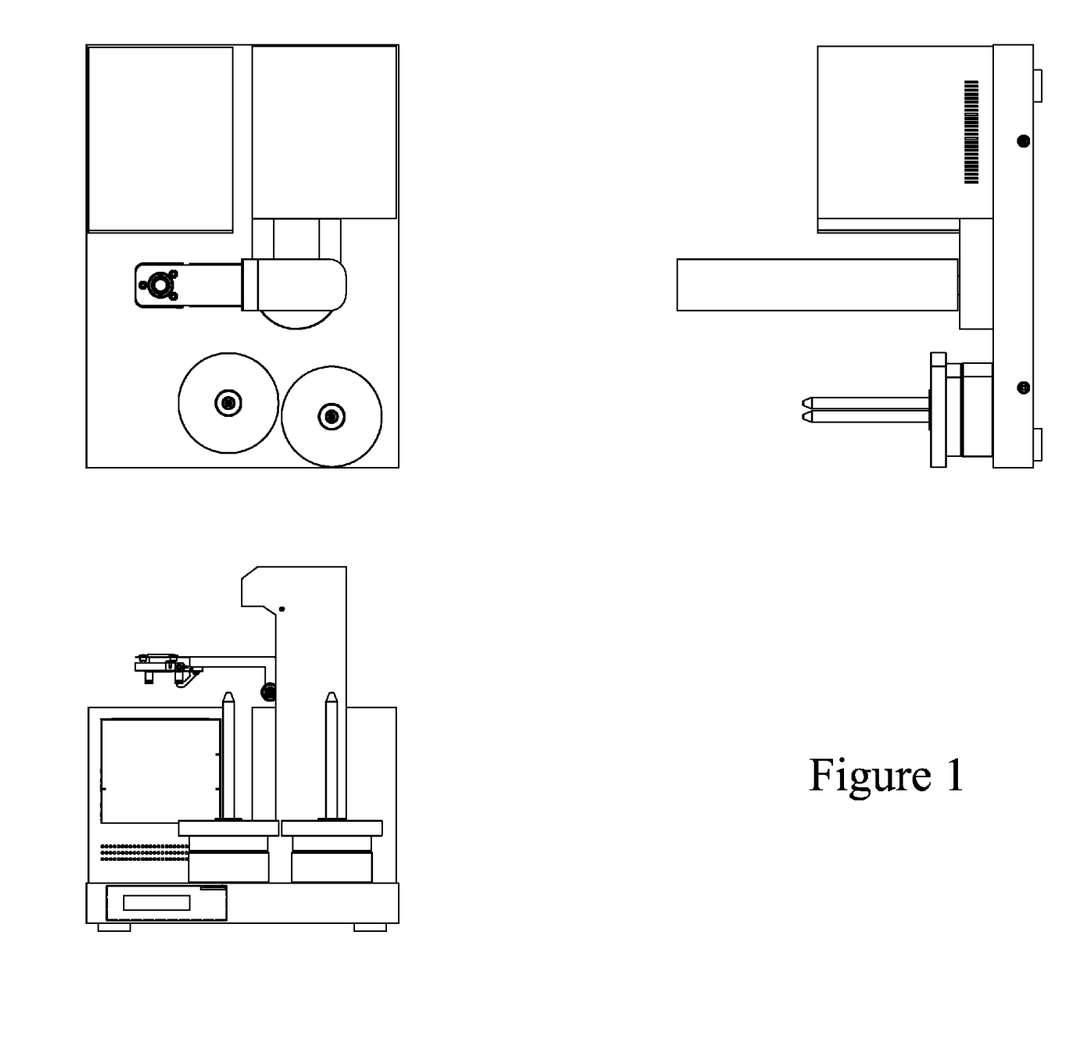
FIG. 1 shows the overall modularization view of this invention in mechanical descriptive geometry.

In FIG. 1, the overall physical module design of present invention is shown. Four physical modules are envisioned in present invention:

1. control and power unit having an embedded motion control board and a communication channel;

2. duplication tower containing writer drives (in any of the formats mentioned above) and an embedded duplication control board;

3. robotic arm containing joints and sensors, and controlled by multiple actuators implemented by DC motors; and, 4. platform (base) providing user interface and geometry datum plane.

Additionally, a number of disk stacks, in the form of spindles, are located on the platform. Conceptually, these disk stacks can also be treated as modules depending individual implementation of any variations based on the disclosure of present invention.

Figure 3:
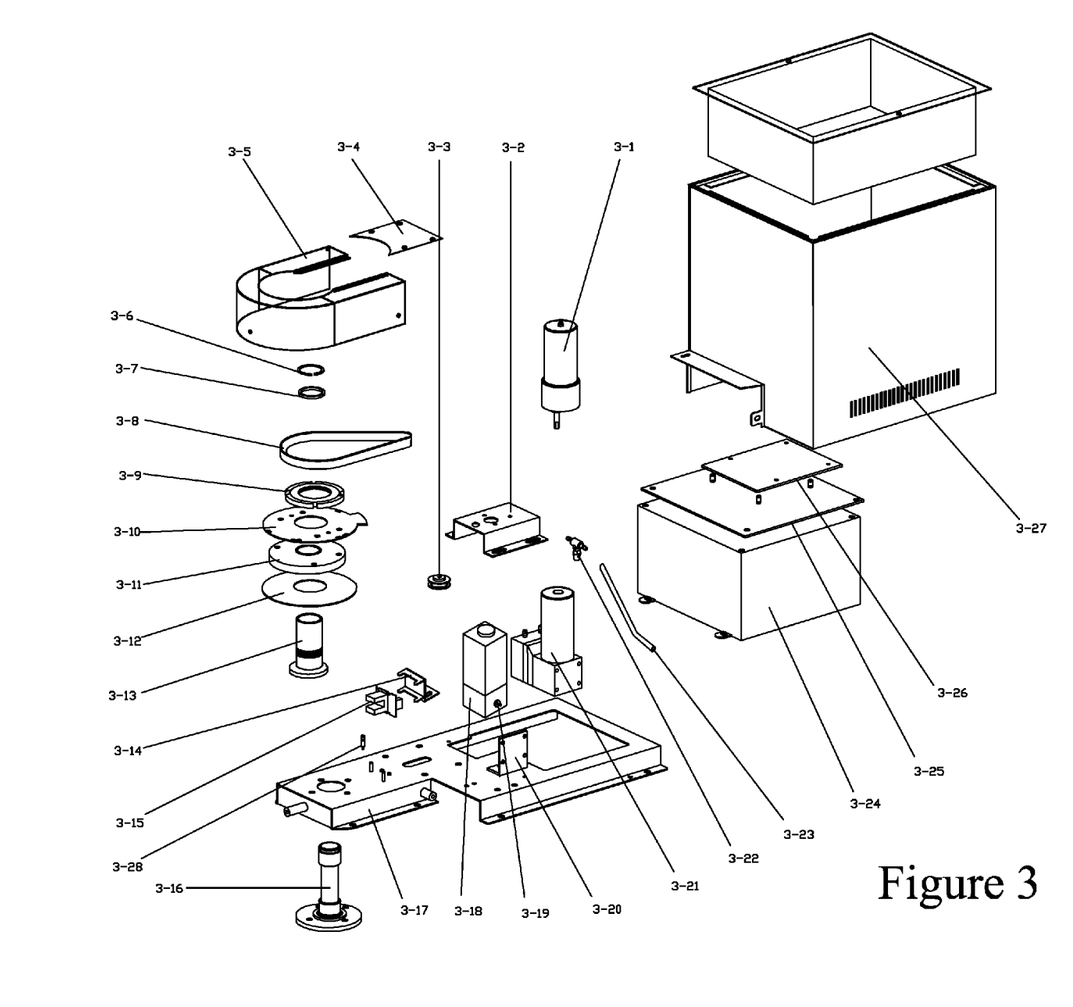
FIG. 3 shows an assembling schematic of the motion control and power module.

Every module has its intended function in this invention, and can be assembled and replaced separately by end users. Their mechanical geometry relationships, e.g. related location, form, profile, orientation, and runout on a dimensioned feature, are controlled by the geometric dimensioning and tolerancing (GD&T) method. Its purpose is to ensure proper assembly and/or operation of modules, and it is especially useful in this quantity production of interchangeable modules. The complete definition of the method is given in the ANSI Standard Y14.5M-1999, which is a public standards and incorporated herein to this application. The logic relationships of the four modules are predefined in a program executed by a microcontroller based embedded system 3-26, as shown in FIG. 3. A serial transfer communication channel, such as standard RS232, is used to transfer information among the four modules. When the power is turned on, the four modules will send their unique identification numbers (ID) to the embedded system 3-26. Once the embedded system receives these ID, it will search its database and generate a motion control trajectory to sequence and synchronize the motion of every module.

Figure 2:
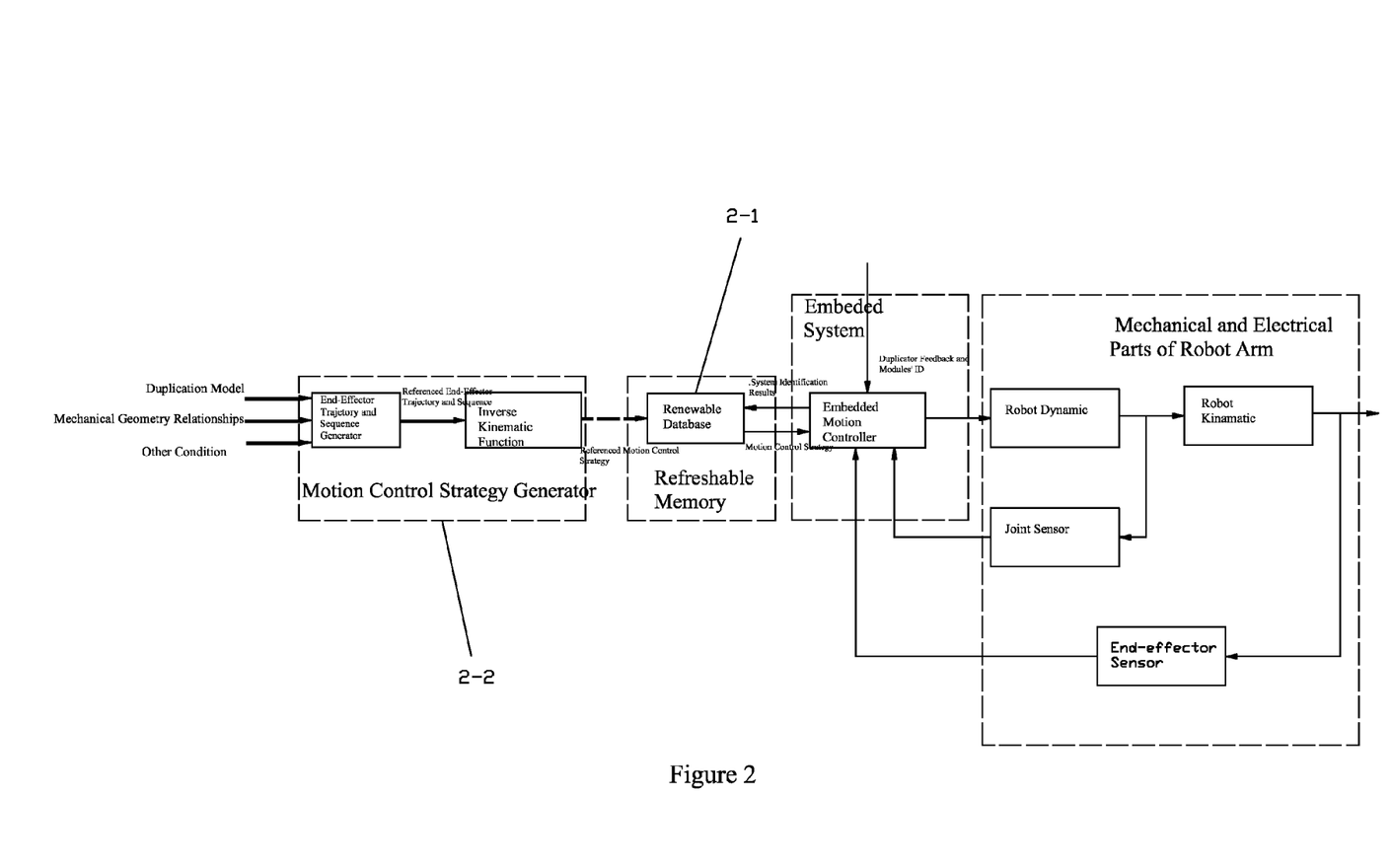
FIG. 2 shows a schematic representation of present invention's operational control flow.

The logical operational flow of the disk copier system as envisioned by present invention can be briefly shown as FIG. 2. A renewable database 2-1 which used to store the referenced motion control strategies is pre-created by a motion control strategy generator 2-2. Manufacturers will supply a default set of motion strategy generator and parameters based on the specific models that are put into the disk copier system built in accordance with the disclosure of present invention. The duplication model (e.g. the optical drive and burner information), the mechanical geometry relationships, and other conditions are entered into this generator. Then an end-effecter trajectory and sequence will be generated. An inverse kinematics function will generate the referenced joints trajectory. Different combinations of the inputs generate different referenced motion strategies and corresponded modules ID. These inputs vs. strategies pairs are stored as a database. After converted to binary code, it can be stored in a refreshable memory 2-1. This memory can be a separately unit or just a part of the embedded motion controller 3-26. In the power-on initial processing (referring to FIG. 9), the embedded motion controller will collect the ID of all modules, search the whole database 2-1, and determine the proper motion strategies. Based on the motion strategies, the motion command will be send out to the execution units, e.g. motor, pump, etc. At the same time, the joint sensor, the end-effecter sensors and duplication burner will be the feedback chain. This feedback chain is used to monitor the execution results of the executed motion strategy, and at the same time, trigger new motion sequential thereafter.

As shown in FIG. 3, the control and power module is a separate box with base frame 3-17 and housing 3-27. Inside the box there is an AC to DC power inverter 3-24 which converts 110 or 220 voltage AC current to 5 and 12 volt DC current. The inverted DC current is used as the power source by all of the electrical driven units in this invention. The embedded motion controller 3-26 is fixed at the top of the AC to DC power inverter by a board fix kit 3-25. A Pump 3-21 is one of the execution units controlled by the embedded motion controller 3-26. The purpose of the pump is supplying air suction to the vacuum gripper 5-16 in FIG. 5. A valve 3-18 is connected with the pump by a pipe line 3-23, a three direction air connector 3-22, and an air connector 3-19. The valve is used to control the direction of air flow between the pump and the vacuum gripper. A suction or release action will then be generated by the vacuum gripper. The valve is directly fixed on the base frame 3-17.

To reduce the vibration noise generated by the pump, the pump is indirectly fixed on the base frame 3-17 by an "L" shape transition kit 3-20. The orientation of the robot arm module can be rotated by a motor 3-1. Any types of motor, e.g. stepping, DC, servo motor can be used as the motor 3-1 as long as the rated torque of the motor is bigger than the requirement of the robot arm rotation. The different selection of motor will be refereed to the module ID number. The actually motor model will be identified in the initial processing, and proper motion control strategies will be selected. The motor is upside-down fixed on the base frame by a motor fix kit 3-2. Since motors are typically operated at too high of a speed and deliver too low a torque to be appropriate for the robot arm orientation application, a belt-drives speed reduction mechanism is applied to reduce rotational speed, and increase the torque in proportion. A smaller drive pulley 3-3 is attached to the motor shaft, while a large diameter pulley 3-11 is attached to a parallel shaft that operates at a correspondingly lower speed. A synchronous belt 3-8 is used as flexible power transmission element to transfer the rotation power between two pulleys. The large diameter pulley 3-11 and a rotation platform 3-10 are tightness fit with a bushing 3-13. The robot arm module is placed on the top of the rotation platform. Due to the tightness fit, the rotation motion generated by the large diameter pulley 3-11 is transferred to the bushing, and the rotation platform. A shaft 3-16 is fixed on the base frame 3-17, and looseness fit with the bushing.

In this application, the shaft provides the rotation support for the bushing. In the rotation axis direction, the related motion of the bush, pulley, and rotation platform is restricted by a collar 3-6, spacers 3-7, and a locknut 3-9. An buffer plate 3-12, and the rotation platform 3-10, restrict the motion of timing belt 3-8 at the rotation axis direction. A dual channel phototransistor 3-15 is placed at the edge of the rotation platform and is fixed on the base frame by a sensor kit 3-14. The encoder marked at the edge of the rotation platform is read by the dual channel phototransistor. Based on the feedback information from the dual channel phototransistor, the embedded controller controls the motor rotation to orientate the robot arm module to the desired direction. A half-circle cover 3-5 and a dual channel sensor cover are placed to cover the rotation parts.

Figure 4:
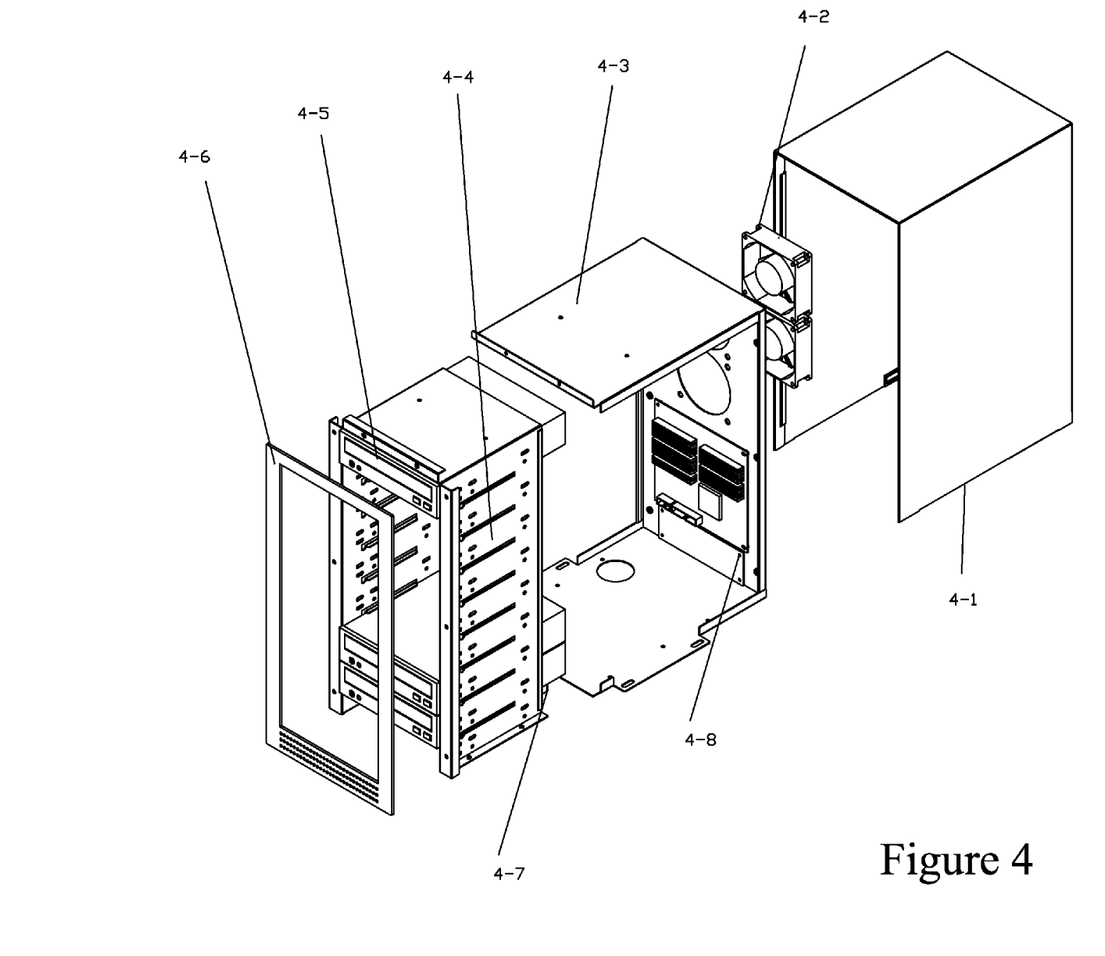
FIG. 4 shows an assembling schematic of the duplication tower module

The duplication tower module, as shown in the FIG. 4, has a housing which includes cover 4-1, one or two cooling fans 4-2, a rear cover 4-3, a drive frame and a front cover 4-6. Inside this housing, multiple optical drives 4-5, e.g. CDRW, CDR, DVDR, DVDRW, etc, are placed in one stack, or a matrix to convert the data between the digital binary format and optical format.

Multiple writer drives are used in present invention. These drives are commercially available models and are not claimed in and of themselves as part of this invention, except the manner as they are described and claimed in combination with other components of present invention.

A hard drive 4-7 or other digital data source is used to store the digital binary data. The data and control flow among the optical drives and hard drive is controlled by a duplication burner 4-8. From the series communication channel, e.g. RS232, the duplication burner communicates with the embedded motion controller to transfer the status information of each other. The duplication processing is synchronized with the robot arm motion so that the motion of loading blank disk and unloading duplicated optical disk motion can be repeated automatically. In terms of duplication tower modules, different ID number corresponds to a different combination of components and customs' requirement, e.g. optical drives, burner controller, and the number of drives.

Multiple writer drives are used in present invention. These drives are commercially available models and are not claimed in and of themselves as part of this invention, except the manner as they are described and claimed in combination with other components of present invention.

Figure 5:
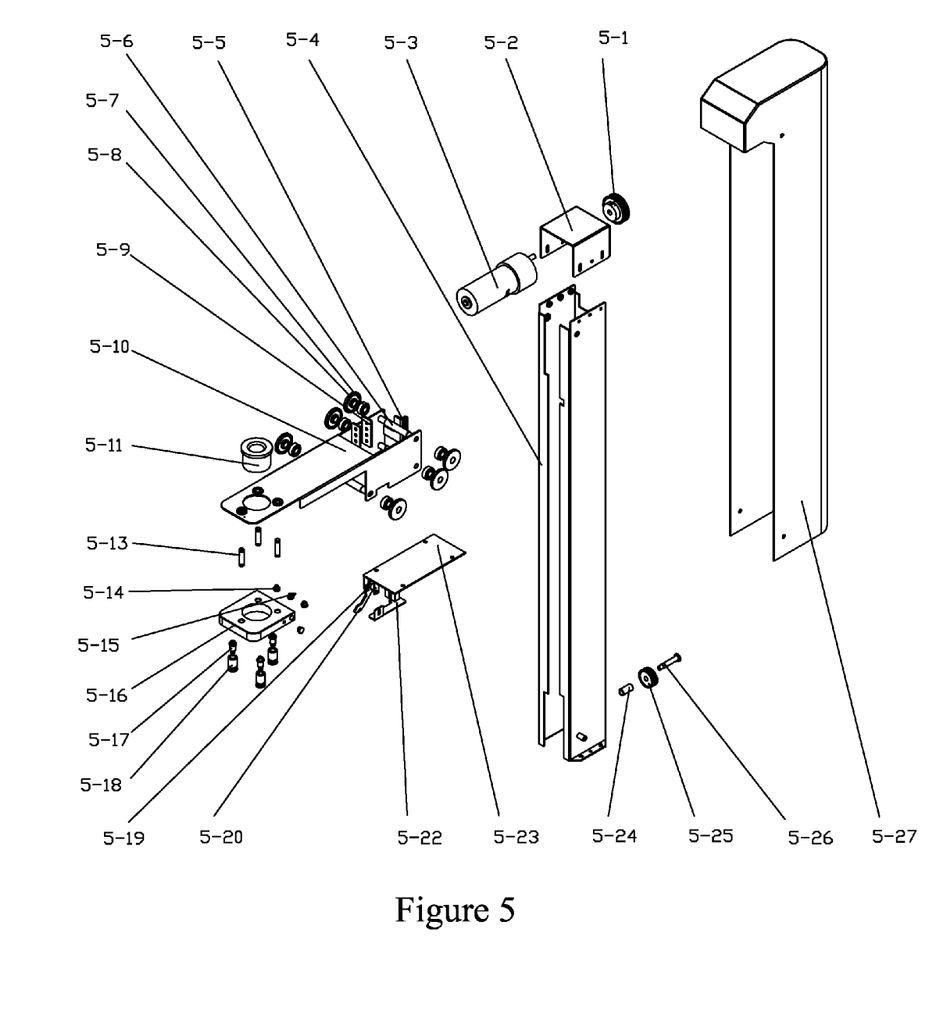
FIG. 5 shows an assembling schematic of the robot arm module

The robot arm module, as shown in the FIG. 5, has a linear (prismatic) joint with a vacuum grab 5-16, a columniation 5-4, and a forearm 5-10. The optical disks can be suctioned up by the vacuum grab and lifted up and down with the motion of the linear joint. The robot arm can be rotated on the rotation platform, effectuating a cylindrical coordinate motion: one rotary (revolute) motion and one linear (prismatic) motion. A motor is placed at the top of the columniation 5-4, and be covered by a motor cover 5-2. Again, any types of motor, e.g. stepping, DC, servo motor can be used as the motor 5-3 as long as the rated torque of the motor is bigger than the requirement of the forearm up-and-down motion.

A drive pulley 5-1 is attached to the motor shaft, while another same diameter pulley 5-25 is attached to a parallel shaft 5-26 that operates at a same speed. A synchronous belt is used as flexible power transmission element to transfer the rotation power between two pulleys. A synchronous kit 5-5 is fixed with the forearm and the synchronous belt; and transfers the up and down motion of synchronous belt to the forearm. Three sets of bearing-shaft combination (5-6, 5-7, and 5-8) are placed to support the forearm smoothly moving on the surface of the columniation.

A sensor board 5-23 with a left trigger 5-20, a right trigger 5-22, and two photo sensors 5-19 are used as end-effector sensors to detect the optical disk and obstacle. Once both of the triggers are affected, the embedded controller will note that the forearm touches an obstacle, if only the left trigger is affected, the embedded controller notes it is an optical disk. There are two more photo sensors on the board to read the encoder on the columniation. This feedback will be used by the embedded controller to control the up and down position of the forearm.

The vacuum grab 5-16 has three cupules 5-17 and 5-18. One air connector 5-15 is connecting with the vacuum pump by a pipe line. Three shafts 5-13 and one shaft block 5-11 are used to smooth the stress under impact when the grabber touches an object, such as an optical disk. The whole robot arm is covered by an arm cover 5-27. Normally, the three cupules are distributed on a 44 millimeter circles. But in some special application, the three cupules may have different distribution to grab some compact optical disks with special size and shape, such as the mini CD; a mechanical grabber has to be used to grab the disk from the center hole of a disk instate of the vacuum grabber. It can avoid the grabber touching the coating on the disk surface. Moreover, the robot configurations, such as the number of joints, the motion of joints and reach (the maximum distance a robot can reach within its work envelope), can be modified to satisfy special design requirements. In all of the above special situations, a dedicated ID module number is assigned to every modified design.

Figure 6:
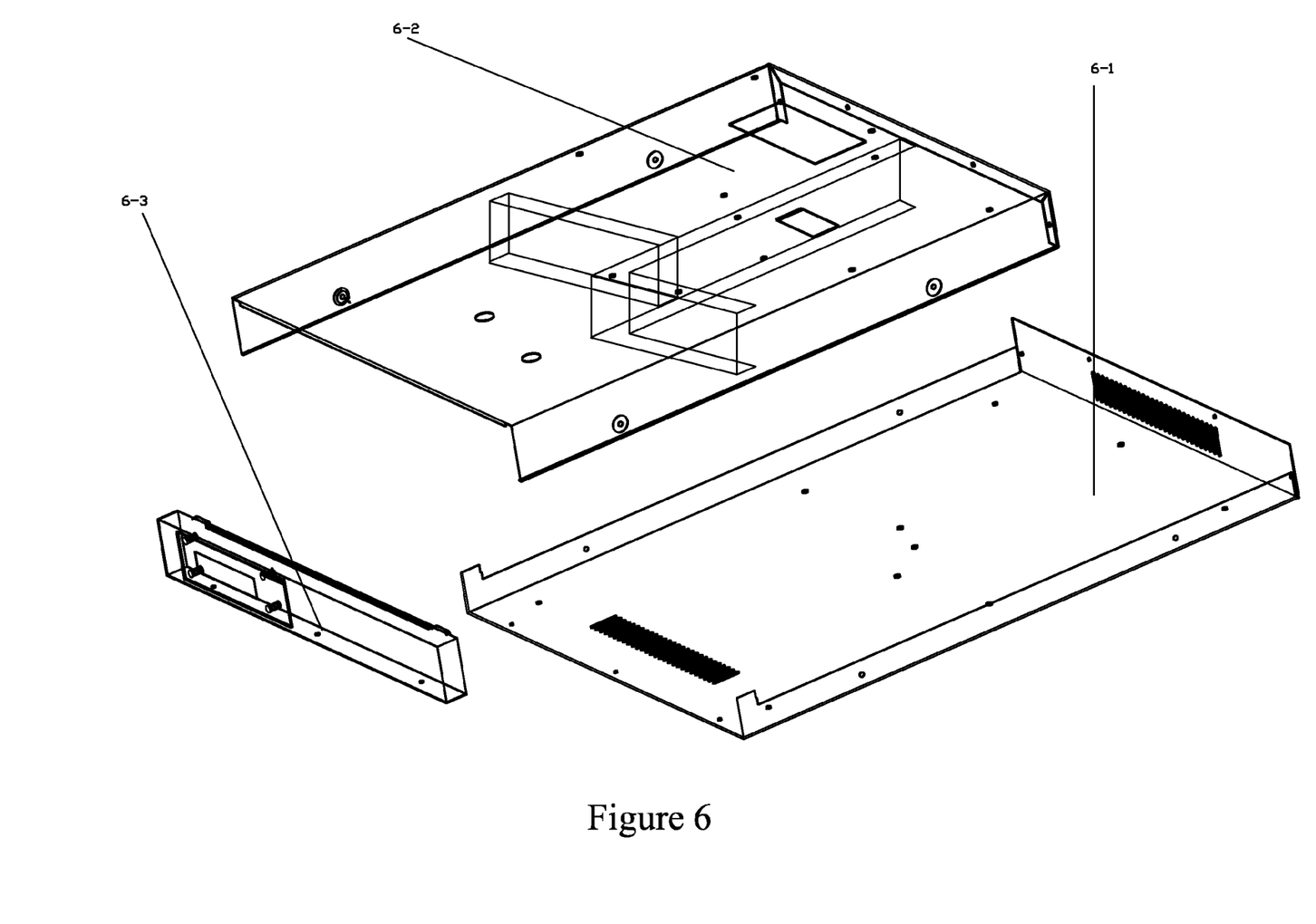
FIG. 6 shows an assembling schematic of the platform module

The platform module, as shown in FIG. 6, provides a user interface 6-3 to users: LCD on this interface is connected with the duplication burner and embedded motion controller to monitor the system status of this invention, and several touch button used to send the supervisory commands to the burner and controller. The standard ASCII commands are used as the protocol in the communication between the interface with the burner or controller. An upper 6-2 and an under 6-1 platform are used as a geometry datum plane to support and fix other modules on above.

Figure 7:
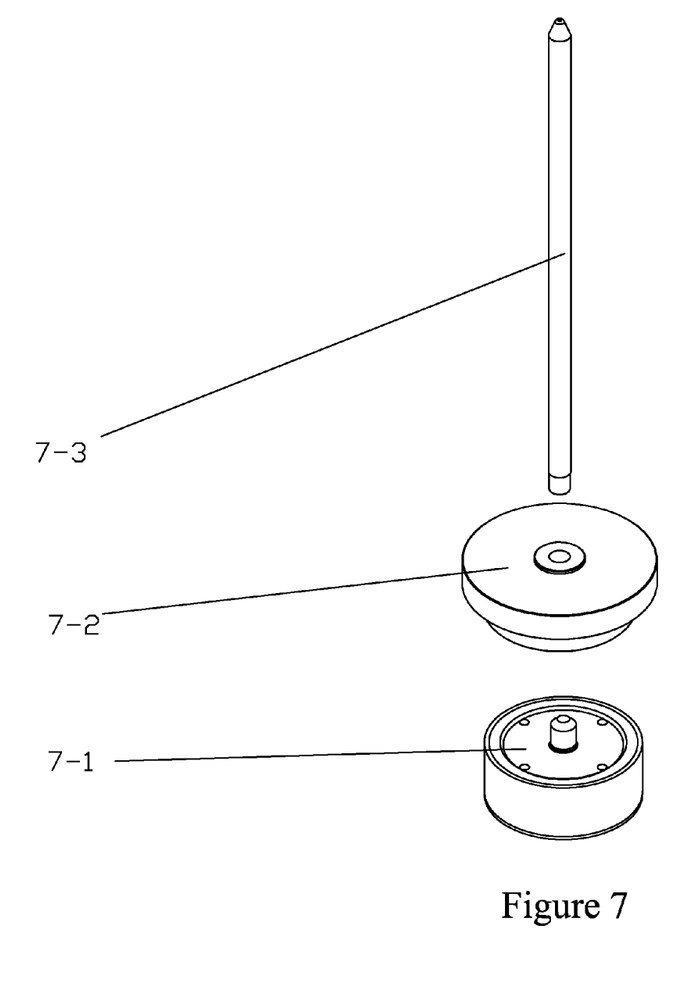
FIG. 7 shows disks stacks as represented by one spindle.
Figure 8:
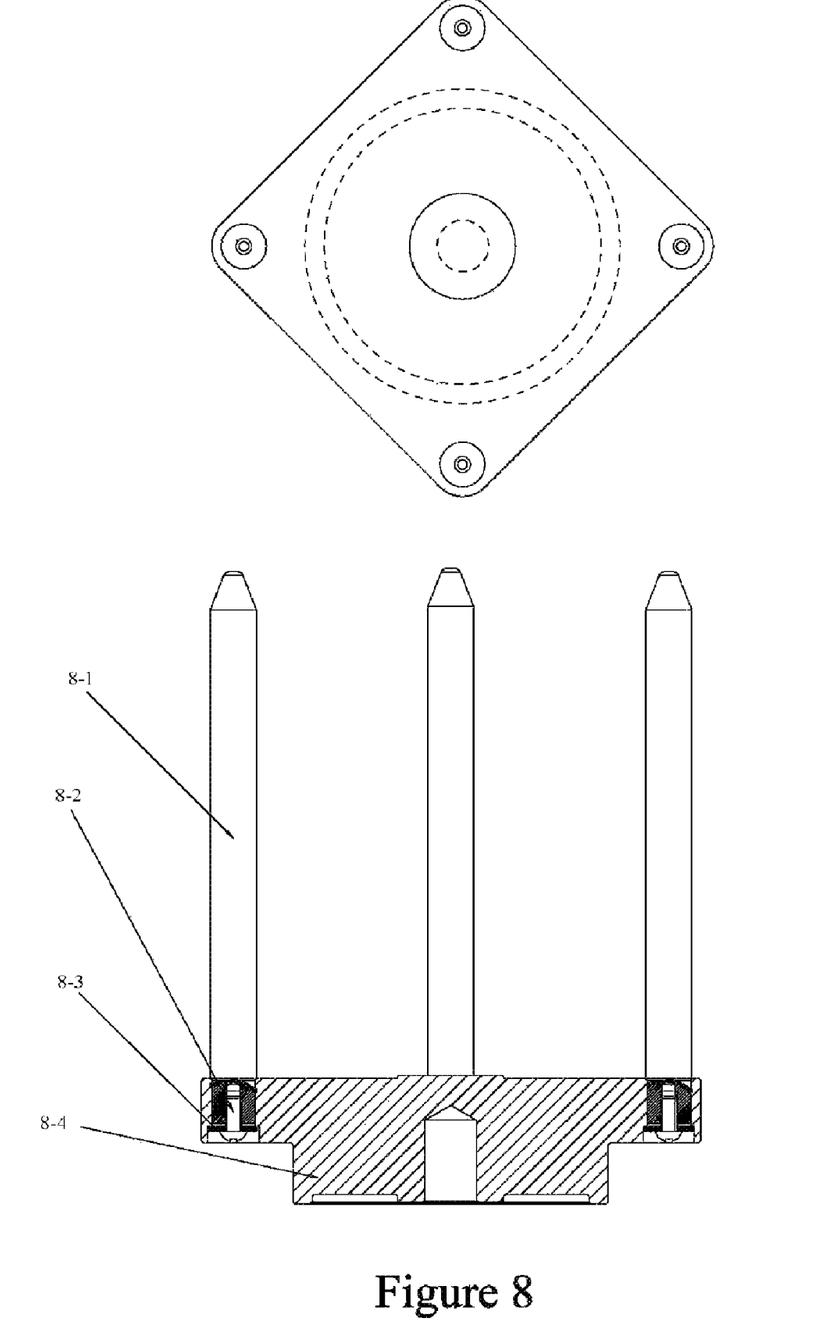
FIG. 8 shows an assembling schematic of the disk stacks with four pillars.

The disks stacks, as shown in FIG. 7, includes a spindle 7-3, a salver 7-2, and a stack base 7-1. The stack base is fixed on the platform; the spindle and the slaver are fixed together to load the stack of optical disks from their central hole. In the case, a mechanical grabber has to be used to pick up a optical disk from its central hole, another configuration of disks stack has to be used as shown in FIG. 8. Four pillars are circle around the disks.

The embedded duplication control board contains a microprocessor, Field-Programmable Gate Array (FPGA) and memory to control the data flow between writer drives I/O and data storage such as a hard drive by Direct Memory Access (DMA) or Interrupt-driven I/O method.

Disk copier system of present invention works in two distinct states: initial state and run state. In the initial state, trajectory for the robotic arm and all sensors are loaded in from a reference database. In the system run state, adaptive control algorithm with self-correcting function will monitor real-time feedback and cause new weighted average time for each segmented trajectory to be recalculated.

Implementation of the two system run states is accomplished by the set of self-adaptive control algorithm having the logical modules of one Motion Strategy Database and four processes of Initial Process, Motion Planning Process, Motion Generating Process and Motion Monitor Process.

Figure 9:
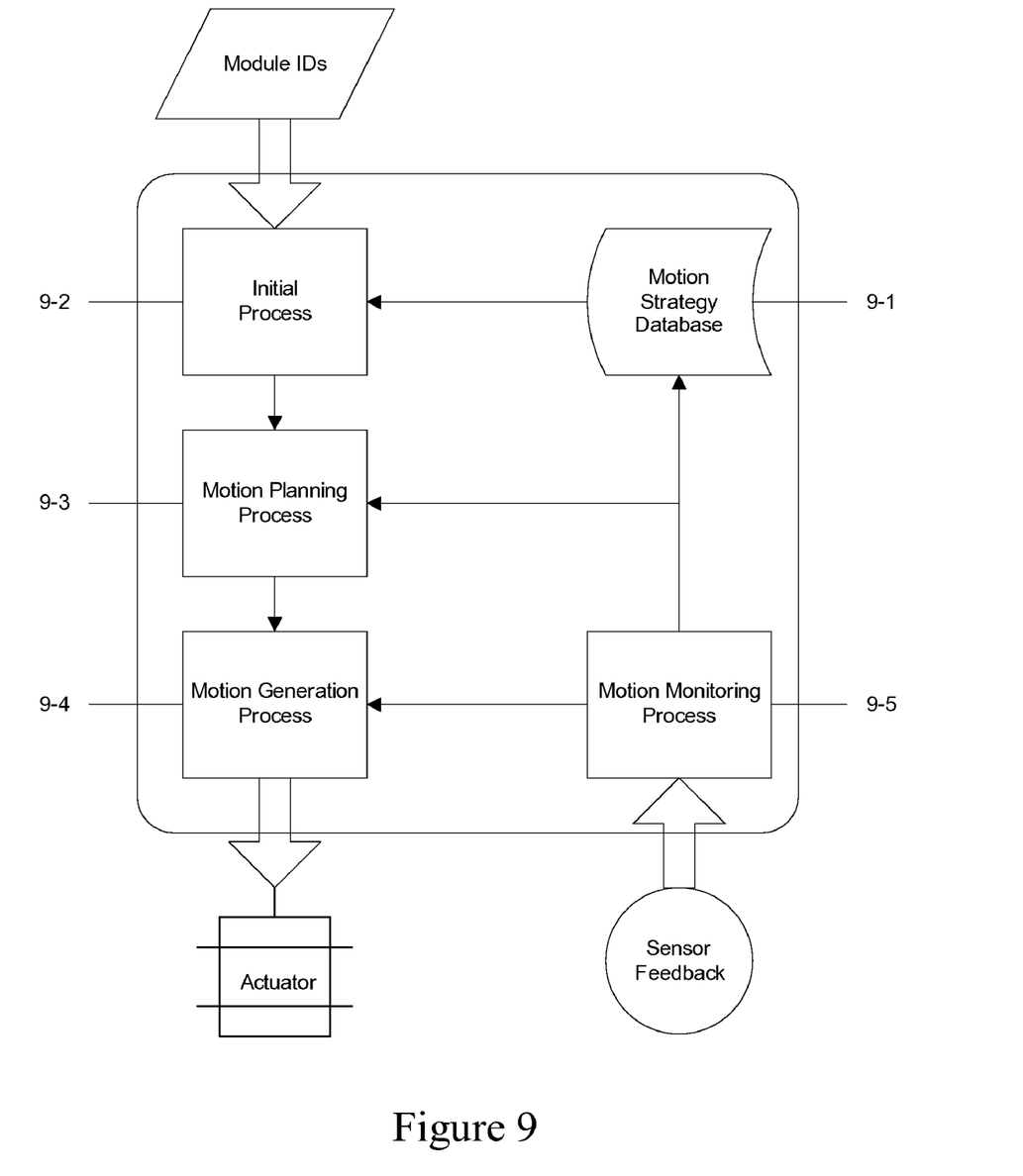
FIG. 9 shows the modular control and implementation of software process-modules used in the self-adaptive algorithm.

Referring to the FIG. 9 for architecture of the algorithm, which can be implemented by commercially available programming tools, such as C++, the Initial Process determines the modules comprising the present configuration and selects a corresponding motion strategy from the built-in Motion Strategy Database. Motion Planning sets up the parameters required for the proper motion of the robotic arm based on the strategy chosen in the previous step.

The actuators in the system are then driven by the commands sent out from the Motion Generation Process and make the robotic arm follow the desired trajectory.

Meanwhile, Motion Monitoring Process collects feedback from sensors in a real-time basis. The information obtained reflects the external environment to which the Motion Planning should accommodate in order to ensure the smooth and precise operation. It is also feasible to update the built-in Motion Strategy Database in a period of time with data cumulated in the Motion Monitoring Process and make the initial motion strategy most appropriate and up to date upon power-on next time. The whole design including the database and four processes achieves the goal that the system self-adapts to the present configuration of modules and environment with little user interference.

Motion Strategy Database consists of a set of control parameters used to define the behaviors (aka loading trajectory) of all actuators. According to the type of actuators, control parameters may vary. The speed parameter for a DC motor of present invention controlled by pulse width modulation is the duty cycle with fixed pulse frequency. Specifically, the speed (rpm) of a DC motor with respect to time r(t) is a function of duty cycle with respect to time c(t): r(t)=f(c(t)).

Either the angular or translational velocity can be derived with the ratio decided by the attached gear wheel and belt system. The orientation and displacement of the robotic arm are hence calculated by the integral of angular and translational velocity, respectively. In practice, present invention specifies the duty cycle in discrete time domain rather than in continuous time domain, $$p(T_{k+1}) = a \sum_{i=0 \sim k} f(c(T_i))(T_{i+1} - T_i),$$

where $p(T_{k+1})$ is the displacement at time step k+1, a the constant ratio. The orientation is similarly derived. A desired motion trajectory is achieved by providing every actuator its corresponding duty cycle function with respect to time step. Refer to FIG. 7 for illustration of the trajectory in one dimension along with the velocity function.

Table 1 shows the example database layout. Each row represents a preset motion strategy for a certain configuration, and $W_b^a(t)$ is the set of parameters for all actuators in order to complete an action b under the configuration a. An action could be a general movement such as loading discs from spindles to drive trays, or a fraction of motion involved in the aforesaid movement such as going down from the top position to level of the drive 3. The database is stored in non-volatile storage device with or without the capability of update.

Referring to FIG. 9, again, the Initial Process is responsible for determining the present configuration of the system and searches through the Motion Strategy Database described above to find a match. A configuration is a certain combination of all modules forming the entire system, and a module may send out the identification information actively or be recognized passively by the hardware settings.

The Motion Strategy Database should contain all possible configurations and each configuration has exactly one corresponding motion strategy. Since motion strategies are indexed by their configurations, the search is performed promptly. There is always a default motion strategy which is selected whenever the match of current configuration cannot be found.

After Initial Process passes the motion strategy to Motion Planning Process, which will extract the parameters for each actuator depending on the actions being carried out. Only one action is performed at the moment and the control parameters for actuators are sent to the motion generation process. In addition, this process takes into account the feedback information of the action just executed from the Motion Monitoring Process to adjust the control parameters. The next time the same action is requested, the revised parameters are applied instead of those set by the original strategy.

Ideally, the effect has to be exactly the same each time an action is performed given the same control parameters. Closed loop control as implemented by present adaptive algorithm is therefore adopted to ensure that the robot arm completes designated actions and the adjustment of control parameters smoothes the motions without extra sensors.

Figure 10:
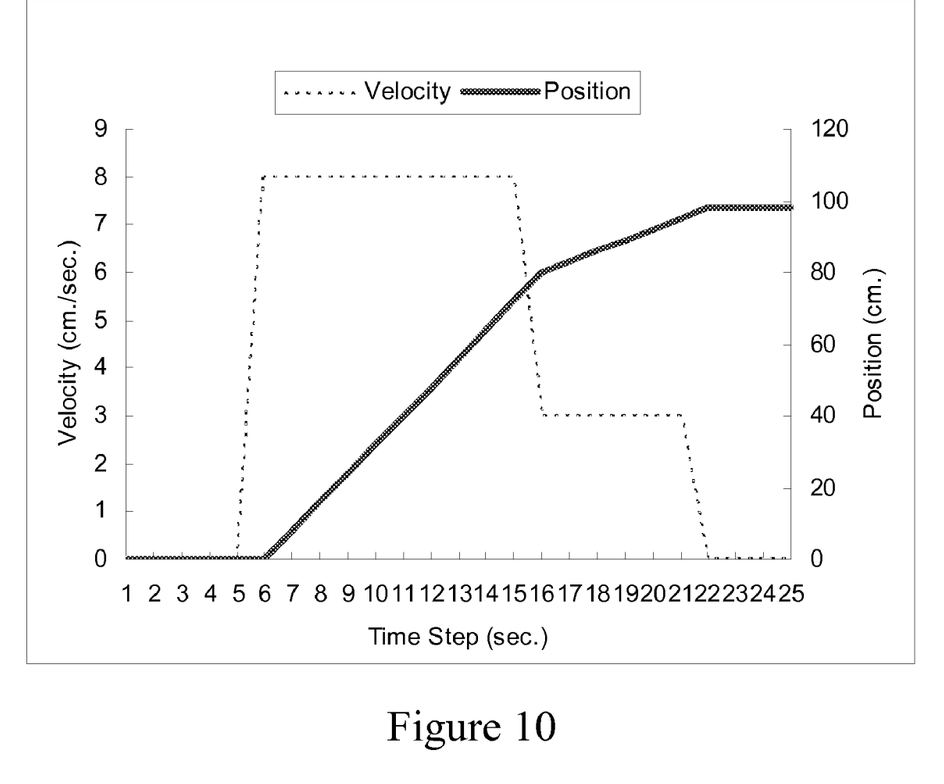
FIG. 10 shows the exemplar velocity/position of a 1-D trajectory.

Test data and statistics of present invention, as shown in FIG. 10, shows that the robot stays at origin for the first 6 seconds, starts moving to 80 cm. with constant speed, and slows down until it arrives at 98 cm. at 22 sec., regarding the tray of drive 3, for example. The obstacle sensor also experiences a state transition simultaneously indicating that an obstacle has encountered and stops the motor. If somehow the obstacle sensor is not triggered and the robot is 1 cm. away from the tray, the velocity function has to change to compensate the unexpected consequence. Either the velocity increases slightly in order to reach the designated position within the allowed time or the velocity maintains for an extra duration until the sensor is triggered.

Vast methods can be applied in the adjustment computation, and weighted moving average is implemented in this invention as following:

$$a_{i+1} = 0.75 a_i + 0.25 a_i',$$

where $a_i$ is the forecasted value and $a_i'$ the measured value. If we keep the value of velocity and consider that measured time is one second longer than the original allowed time in FIG. 2, a new forecasted value is calculated by $$22.25 = 0.75(22) + 0.25(23).$$

The next time the same action is requested, the motor will continue the operation for extra 0.25 seconds to make up the differences, and a new forecasted value will be calculated again. Eventually, the control parameters should converge to stable values and the robot realizes the motions requested smoothly.

In the Motion Generation Process, the control parameters are translated into control signals and sent out to the actuators through proper drive circuitry. For a DC motor driven by pulse width modulation, rectangular waveforms are generated and duty cycles are decided by the control parameters. Again, control signals may vary depending on the type of motors being used, such as stepping and servo motors.

Referring to FIG. 9, the Motion Monitoring Process derived its feedback and robotic arm positions by sensors installed in the system and records the responses of these sensors at a fixed sampling rate faster enough to reflect the robot status. For a certain action like going down from the top position and reaching the tray of drive 3, the sensors will experience the state transition and the monitoring process would note down the status when the requested action is complete and stop the actuators. The Motion Monitoring Process also provides feedback information, such as actual execution velocity or time duration, to the Motion Planning Process to update the control parameters.

Self-adaptive algorithm takes effect in multiple aspects during the system operation. One example is the loading blank disc motion during which the robotic arm picks up a disc from the disk stack module, moves to the duplication tower module and places the disc into the drive tray.

The height of the duplication tower may vary to stack diverse number of optical drives, and optical drives themselves are also not limited to single model. In case of different duplication tower modules or different models of optical drives being assembled, different loading motion strategies have to be applied due to the changes of various factors that affect the loading motion such as the distance of the drive tray to the grabber, which determines the robotic motion when it approaches the drive tray. The robotic arm goes down from the top position in high speed and slows down when the distance between the grabber and the drive tray decreases to a predefined value. The self-adaptive motion control algorithm picks up a motion strategy by searching a match in the Motion Strategy Database for the present duplication tower module configuration. The algorithm also performs real-time self-correction based on the feedback from sensors because of possible inaccuracies described in the previous section. The Motion Planning-Motion Generation-Motion Monitoring processes cycles make the continuous system operations motion seamlessly.

Other application of self-adaptive control algorithm includes picking up discs from spindles, picking up discs from drive trays, etc. These implementations guarantee the operation of the system without losing flexibility and extensibility.

What is claimed is:

1. A Standalone Intelligent Autoloader with Modularization Architectures, comprising:
   a. A robotic arm further having multiple joints and sensor and controlled by multiple actuators implemented by DC motors;
   b. A duplication tower further having an embedded duplication control board and multiple writer drives;
   c. A control and power unit further having an embedded motion control board and a communication channel between said duplication tower and said embedded motion control board;
   d. A platform having disk stacks, user interface and geometry datum plane and a pre-designed self-adaptive control algorithm further consisting of a Motion Strategy Database, and four logical process-modules of Initial Process, Motion Planning Process, Motion Generating Process and Motion Monitor Process, wherein the orientation and displacement of the robotic arm, as control parameters used and stored in the Motion Strategy Database, are calculated by the integral of angular and translational velocity, respectively, by specifying the duty cycle in discrete time domain in the formula, $$p(T_{k+1}) = a \sum_{i=0\sim k} f(c(T_i))(T_{i+1} - T_i),$$

where $p(T_{k+1})$ is the displacement at time step k+1, a the constant ratio;
wherein the sensors are either joint sensors to sense position and acceleration/deceleration, or end-point sensors to sense the physical interaction between the gripped disk and the environment.

2. The system of claim 1, wherein, said self-adaptive control algorithm is stored in said motion control board in the form of EPROM and Flash memory and can be renewed and upgraded by end users.

3. The system of claim 2, wherein the Initial Process collects the ID numbers of every module when the system is powered on, enabling the configuration to be recognized by the system when said stored parameters from the Motion Strategy Database are extracted for use in later stage.

4. The system of claim 3, wherein the speed (rpm) of a DC motor, as a control, parameter used and stored in the Motion Strategy Database, with respect to time r(t) is a function of duty cycle with respect to time c(t) expressed in the formula: r(t)=f(c(t)).

5. The system of claim 1, wherein the duplication embedded control board further having a microprocessor, Field-Programmable Gate Array (FPGA), and memory, to control the data flow between writer drives I/O and data storage such as a hard drive by Direct Memory Access (DMA) or Interrupt-driven I/O methods.

6. The system of claim 5, wherein the geometry datum plane is a mechanical restriction to regulate the geometry relationship among each modules, wherein the geometry relationship between said the duplication tower module and the disk stacks has to be in the effective trajectory region of the robot arm.

7. The system of claim 6, wherein the communication channel comprises a RS232-compatible chip to transfer communication data between motion control board and duplication control board.

* * * * *